(12) United States Patent
Connell (10) Patent No.: US 12,100,167 B2
(45) Date of Patent: Sep. 24, 2024

(54) ESTIMATING A TRAJECTORY PATH OF AN OBJECT

(71) Applicant: Mark Connell, Draper, UT (US)

(72) Inventor: Mark Connell, Draper, UT (US)

( * ) Notice: Subject to any disclaimer, the term of this patent is extended or adjusted under 35 U.S.C. 154(b) by 394 days.

(21) Appl. No.: 17/523,791

(22) Filed: Nov. 10, 2021

(65) Prior Publication Data

US 2023/0144415 A1 May 11, 2023

(51) Int. Cl.
| | |
|---|---|
| *G06T 7/246* | (2017.01) |
| *G01S 17/89* | (2020.01) |
| *G06T 7/70* | (2017.01) |
| *G06V 20/54* | (2022.01) |

(52) U.S. Cl.
CPC .............. *G06T 7/248* (2017.01); *G01S 17/89* (2013.01); *G06T 7/70* (2017.01); *G06V 20/54* (2022.01); *G06T 2207/20081* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 7,984,559 B2 | 7/2011 | Burns et al. | |
| 8,616,993 B2 | 12/2013 | Bittner | |
| 9,211,439 B1 * | 12/2015 | Pedenko | A63B 69/36 |
| 9,233,291 B2 * | 1/2016 | Kamino | G06T 1/0007 |
| 9,782,656 B2 | 10/2017 | Burke | |
| 9,821,210 B2 | 11/2017 | Cottam et al. | |
| 10,444,339 B2 | 10/2019 | Tuxen et al. | |
| 10,706,273 B2 | 7/2020 | Bose et al. | |
| 10,780,332 B1 | 9/2020 | Lilleston et al. | |
| 10,881,908 B2 * | 1/2021 | Bentley | A63B 24/0062 |
| 2005/0202891 A1 | 9/2005 | Otten et al. | |
| 2005/0215335 A1 | 9/2005 | Marquardt | |
| 2013/0190098 A1 | 7/2013 | Kiraly et al. | |
| 2014/0378238 A1 | 12/2014 | Voges et al. | |
| 2017/0239522 A1 | 8/2017 | Voges et al. | |
| 2017/0272703 A1 * | 9/2017 | Allen | H04N 7/183 |
| 2020/0398110 A1 * | 12/2020 | Kosowsky | A63B 69/36 |
| 2021/0008430 A1 * | 1/2021 | Pennacchia | G06F 1/1694 |
| 2023/0144415 A1 * | 5/2023 | Connell | G01S 17/66 382/100 |
| 2024/0033599 A1 * | 2/2024 | Johnson | A63B 53/0466 |

FOREIGN PATENT DOCUMENTS

EP 1509781 4/2015

* cited by examiner

*Primary Examiner* — Soo Shin

(74) *Attorney, Agent, or Firm* — Kunzler Bean & Adamson (57) ABSTRACT

Apparatuses, methods, and systems are disclosed for estimating a trajectory path of an object. An apparatus includes an object module that identifies a target object based on data captured from a first sensor. An apparatus includes a location module that identifies the target location for the target object based on data captured from a second sensor. An apparatus includes a path module that determines an objective path for the target object relative to the target location. An apparatus includes a surface module that identifies a surface of a striking object that is configured to cause the target object to move along a trajectory path towards a target location. A path module estimates the trajectory path of the target object towards the target location and relative to the objective path prior to the striking object contacting the target object.

20 Claims, 6 Drawing Sheets

ESTIMATING A TRAJECTORY PATH OF AN OBJECT

FIELD

This invention relates to object tracking and more particularly relates to estimating a trajectory path of an object.

BACKGROUND

Sports simulators can be used to simulate sports motions within a controlled environment.

SUMMARY

Apparatuses, methods, and systems are disclosed for estimating a trajectory path of an object. In one embodiment, an apparatus includes an object module that identifies a target object based on data captured from a first sensor. In one embodiment, an apparatus includes a location module that identifies the target location for the target object based on data captured from a second sensor. In one embodiment, an apparatus includes a path module that determines an objective path for the target object relative to the target location. In one embodiment, an apparatus includes a surface module that identifies, using data captured from the first sensor, a surface of a striking object that is configured to contact the target object and cause the target object to move along a trajectory path towards a target location. In one embodiment, the path module estimates the trajectory path of the target object towards the target location and relative to the objective path prior to the striking object contacting the target object based on the data captured from at least one of the first and second sensors.

In one embodiment, a method includes identifying a target object based on data captured from a first sensor. In one embodiment, a method includes identifying the target location for the target object based on data captured from a second sensor. In one embodiment, a method includes determining an objective path for the target object relative to the target location. In one embodiment, a method includes identifying, using data captured from the first sensor, a surface of a striking object that is configured to contact the target object and cause the target object to move along a trajectory path towards a target location. In one embodiment, a method includes estimating the trajectory path of the target object towards the target location and relative to the objective path prior to the striking object contacting the target object based on the data captured from at least one of the first and second sensors.

In one embodiment, a system includes a first sensor, a second sensor, a target object, a striking object, and a target location. In one embodiment, a system includes an apparatus that includes an object module that identifies a target object based on data captured from a first sensor. In one embodiment, an apparatus includes a location module that identifies the target location for the target object based on data captured from a second sensor. In one embodiment, an apparatus includes a path module that determines an objective path for the target object relative to the target location. In one embodiment, an apparatus includes a surface module that identifies, using data captured from the first sensor, a surface of a striking object that is configured to contact the target object and cause the target object to move along a trajectory path towards a target location. In one embodiment, the path module estimates the trajectory path of the target object towards the target location and relative to the objective path prior to the striking object contacting the target object based on the data captured from at least one of the first and second sensors.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Apparatuses, methods, and systems are disclosed for estimating a trajectory path of an object. In one embodiment, an apparatus includes an object module that identifies a target object based on data captured from a first sensor. In one embodiment, an apparatus includes a location module that identifies the target location for the target object based on data captured from a second sensor. In one embodiment, an apparatus includes a path module that determines an objective path for the target object relative to the target location. In one embodiment, an apparatus includes a surface module that identifies, using data captured from the first sensor, a surface of a striking object that is configured to contact the target object and cause the target object to move along a trajectory path towards a target location. In one embodiment, the path module estimates the trajectory path of the target object towards the target location and relative to the objective path prior to the striking object contacting the target object based on the data captured from at least one of the first and second sensors.

In one embodiment, the surface module further determines an orientation of the surface of the striking object relative to the target object based on the data that is captured from the first sensor, the orientation used to estimate the trajectory path of the target object.

In one embodiment, the surface module further determines the orientation of the surface of the striking object relative to the target object at one or more of address of the target object, impact of the target object, and throughout the movement of the striking object.

In one embodiment, the surface module uses the identification of the target object based on data captured from the first sensor as a key for identifying the surface of the striking object.

In one embodiment, an apparatus includes a mapping module that maps the data captured from the first and second sensors into world coordinates using homography to generate a three-dimensional representation of the target object, striking object, and target location relative to one another.

In one embodiment, the object module further determines and tracks at least one of a spin, roll, and skid of the target object in response to impact from the striking object, which is further used to estimate the trajectory path of the target object.

In one embodiment, the path module continuously estimates, in real-time, the trajectory path of the target object towards the target location and relative to the objective path in response to detecting movement of the striking object.

In one embodiment, the apparatus includes a graphics module that generates a graphical representation of the estimated trajectory path of the target object relative to the objective path and presents the graphical representation on a graphical display.

In one embodiment, the graphical representation that is presented on the graphical display is updated in real-time in response to the estimated trajectory path of the target object relative to the objective path being updated.

In one embodiment, the apparatus includes a feedback module that provides one of audio and graphical feedback, in real time, based on an accuracy of the estimated trajectory path of the target object relative to the objective path.

In one embodiment, the apparatus includes a calibration module that initially calibrates the first and second sensors for an area comprising the target location using one or more tracking fiducials for each of the first and second sensors.

In one embodiment, the apparatus includes a metadata module that receives information for identifying a type of the striking object and determines specification information for the identified type of the striking object such that the estimated trajectory path of the target object is further determined based on the specification information for the striking object.

In one embodiment, the apparatus includes a machine learning module that uses machine learning algorithms for identifying at least one of the target object, the surface of the striking object, and the target location based on the data captured from the first and second sensors.

In one embodiment, at least one of the first and second sensors comprises a light detection and ranging ("LIDAR") sensor.

In one embodiment, a method includes identifying a target object based on data captured from a first sensor. In one embodiment, a method includes identifying the target location for the target object based on data captured from a second sensor. In one embodiment, a method includes determining an objective path for the target object relative to the target location. In one embodiment, a method includes identifying, using data captured from the first sensor, a surface of a striking object that is configured to contact the target object and cause the target object to move along a trajectory path towards a target location. In one embodiment, a method includes estimating the trajectory path of the target object towards the target location and relative to the objective path prior to the striking object contacting the target object based on the data captured from at least one of the first and second sensors.

In one embodiment, the method includes determining an orientation of the surface of the striking object relative to the target object based on the data that is captured from the first sensor, the orientation used to estimate the trajectory path of the target object.

In one embodiment, the method includes using the identification of the target object based on data captured from the first sensor as a key for identifying the surface of the striking object.

In one embodiment, the method includes continuously estimating, in real-time, the trajectory path of the target object towards the target location and relative to the objective path in response to detecting movement of the striking object.

In one embodiment, the method includes generating a graphical representation of the estimated trajectory path of the target object relative to the objective path and presenting the graphical representation on a graphical display, the graphical representation updated in real-time in response to the estimated trajectory path of the target object being updated.

In one embodiment, a system includes a first sensor, a second sensor, a target object, a striking object, and a target location. In one embodiment, a system includes an apparatus that includes an object module that identifies a target object based on data captured from a first sensor. In one embodiment, an apparatus includes a location module that identifies the target location for the target object based on data captured from a second sensor. In one embodiment, an apparatus includes a path module that determines an objective path for the target object relative to the target location. In one embodiment, an apparatus includes a surface module that identifies, using data captured from the first sensor, a surface of a striking object that is configured to contact the target object and cause the target object to move along a trajectory path towards a target location. In one embodiment, the path module estimates the trajectory path of the target object towards the target location and relative to the objective path prior to the striking object contacting the target object based on the data captured from at least one of the first and second sensors.

In general, the subject matter disclosed herein is directed to estimating a trajectory path of an object from a starting location to a target location and determining differences between the estimated trajectory path and a dynamically calculated objective trajectory path of the object. The object may be hit, struck, or otherwise caused to move toward the target location using a striking object. For example, the subject matter disclosed herein may be applicable to golfing, and more particularly, to putting. For instance, a user may be purchasing a new putter, may be practicing a swing, and/or the like. The subject matter disclosed herein uses sensor data to track, in real-time, the user's swing, estimate the trajectory path of the golf ball (e.g., the target object) towards a cup (e.g., the target location), and provide feedback for correcting a swing, for selecting a putter to use/purchase, and/or the like, based on a comparison with an objective trajectory path.

Beneficially, in one embodiment, no calibration (e.g., manually defining the placement of an object, redirecting, or configuring sensors, and/or the like) is required for using the disclosed system due to the placement and use of the sensors. Thus, a user can place an object, e.g., a golf ball, anywhere in a predefined area and the proposed solution will dynamically identify the object and the target location relative to the object, and dynamically determine or calculate an optimal, desired, preferred, best, or the like trajectory path for the object towards the target location, e.g., may calculate an angle, line, speed, and/or the like that the object should follow to arrive at the target location.

Moreover, the proposed solution may dynamically calculate or determine an estimated trajectory path of the object based on the orientation (e.g., angle and position relative to the target object and the target location) of the striking object, e.g., a putter, as the user approaches or hits the target object towards the target location. The proposed solution compares the calculated objective trajectory path to the estimated trajectory path of the target object, prior to the user hitting the target object, to determine how closely the estimated trajectory path follows the objective trajectory path. This can be repeated without re-calibrating the system between each approach or hit of different target objects that are place within the predefined area.

Figure 1A:
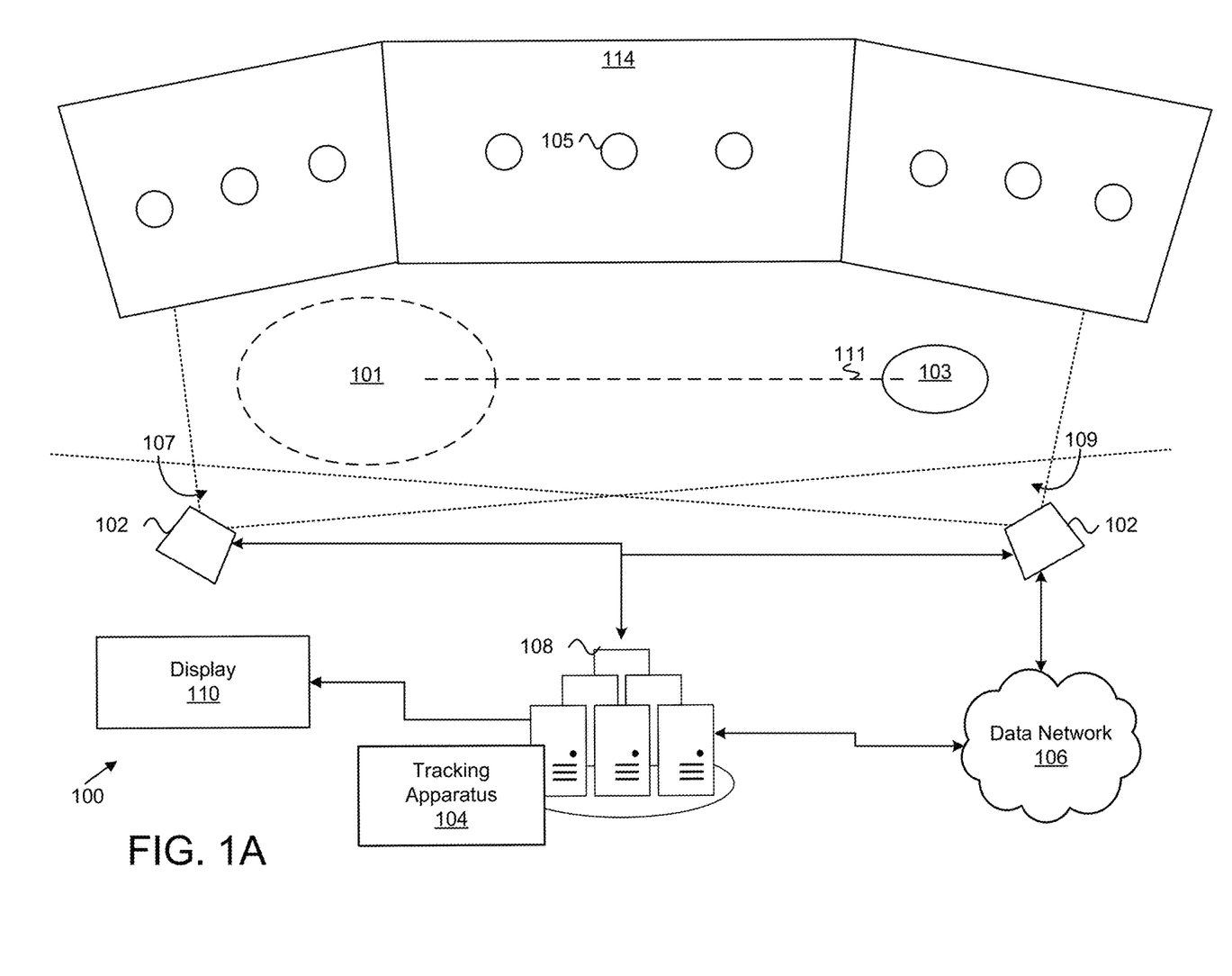
FIG. 1A depicts a perspective view of a system for estimating a trajectory path of an object.

FIG. 1A depicts a perspective view of a system 100 for estimating a trajectory path of an object. In one embodiment, the system 100 includes one or more sensors 102, a tracking apparatus 104, a data network 106, one or more computing devices 108, and a display 110, which are described in more detail below.

In one embodiment, the sensors 102 are configured to detect, track, identify, image, and/or the like one or more objects that are placed with an initial, starting area 101, which may be predefined or may be dynamically determined based on the locations and configurations of the sensors 102. For example, the sensors 102 may capture data that is used for identifying a golf ball and a putter that are placed within the initial area 101. The initial area 101 may be located on the ground, may be located within a three-dimensional space (e.g., a baseball strike zone), and/or the like; may have a predefined shape, e.g., circular, square, spherical, cubic, and/or the like; and/or the like.

In certain embodiments, the sensors 102 are configured to capture a target object, e.g., a golf ball, along a trajectory path 111 towards a target location 103, e.g., a golf cup. The sensors 102 may be positioned and configured to capture data describing the environment or scene that includes the initial area 101 and the target location 103, which the tracking apparatus 104, described below, may use to generate a digital representation of the environment, e.g., a real-world interpretation of the environment, that can be used to predict or estimate the trajectory path 111 of a target object from the initial area 101 relative to the target location 103.

In one embodiment, the sensors 102 may include imaging sensors such as digital cameras, camera modules, thermal imaging devices, radar sensors, sonar sensors, light detection and ranging ("LIDAR") sensors, and/or the like. The sensors 102, in certain embodiments, may include motion sensors, proximity sensors, light sensors, and/or the like. One of skill in the art will recognize, in light of this disclosure, other sensors 102 that may be used within the system 100. The sensors 102 may be placed at various locations, heights, and/or the like within the system 100, e.g., the sensors 102 may be placed back-to-back to capture data from the initial area 101 and the target area 103.

In certain embodiments, the system 100 includes one or more tracking fiducials 105 that may be used to initially calibrate or setup the sensors 102, e.g., to establish a proper location, angle, position, height, and/or the like for the sensors 102 to establish the initial area 101 and the target location 103. The tracking fiducials 105, as used herein, may refer to a marking, object, and/or the like that is used as a point of reference for the sensors 102 to establish depth measurements, locations within the setting, and/or the like. The tracking fiducials 105 may be built into a scene, e.g., as part of artwork or other decorations on walls 114 of a kiosk so that they are not noticeable to the naked eye but are visible and identifiable using the data that the sensors 102 capture.

In one embodiment, the sensors 102 are communicatively and operably connected to one or more computing devices 108. The computing devices 108 may include one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, the sensors 102 are directly connected to a computing device 108, e.g., via a universal serial bus connection or other direct connection. In some embodiments, the sensors 102 are connected to a computing device 108 via a data network 106. The data network 106, in one embodiment, includes a digital communication network that transmits digital communications. The data network 106 may include a wired network, e.g., a network comprising ethernet cables, switches, routers, bridges, and/or the like.

In one embodiment, the data network 106 includes a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In certain embodiments, the system 100 includes a tracking apparatus 104. The tracking apparatus 104, in one embodiment, is configured to identify a target object (e.g., a golf ball) and a striking object (e.g., a putter, or more specifically the putter face) placed within the initial area 101 and a target location 103 for the target object using data that the sensors 102 capture, e.g., data captured within a field of view 107, 109 of the sensors 102, and estimate a trajectory path for the target object relative to the target location prior to the striking object contacting the target object. Thus, the system 100 can predict, estimate, forecast, and/or the like a trajectory or path for a target object prior to, during, and in response to being hit with a striking object so that a user can determine how the striking object approaches the target object, how the striking object strikes the object, and how the striking object follows-through after striking the target object. In this manner, the user can get a complete overview of his/her approach, swing, motion, form, and/or the like for a particular application, e.g., golf, baseball, softball, and/or the like; for a particular striking object, e.g., putter, iron, driver, bat, and/or the like; and/or the like.

In certain embodiments, the tracking apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the tracking apparatus 104 may include a power interface, a wired and/or wireless network interface, a graphical interface that attaches to a display, and/or a semiconductor integrated circuit device as described below, configured to perform the functions described herein with regard to the tracking apparatus 104.

The tracking apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the tracking apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the tracking apparatus 104.

The semiconductor integrated circuit device or other hardware appliance of the tracking apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the tracking apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

In one embodiment, the system 100 includes one or more displays 110 for presenting output that the tracking apparatus 104 generates. The one or more displays 110 may include televisions, monitors, projectors, and/or the like. The output, as described in more detail below, may include a real-time animation or 3D representation of the estimated trajectory path 111, measurements or other details describing the user's swing, motion, and/or the trajectory path 111 of the target object, suggestions and/or recommendations for correcting and improving a swing, form, or motion, and/or the like.

Figure 1B:
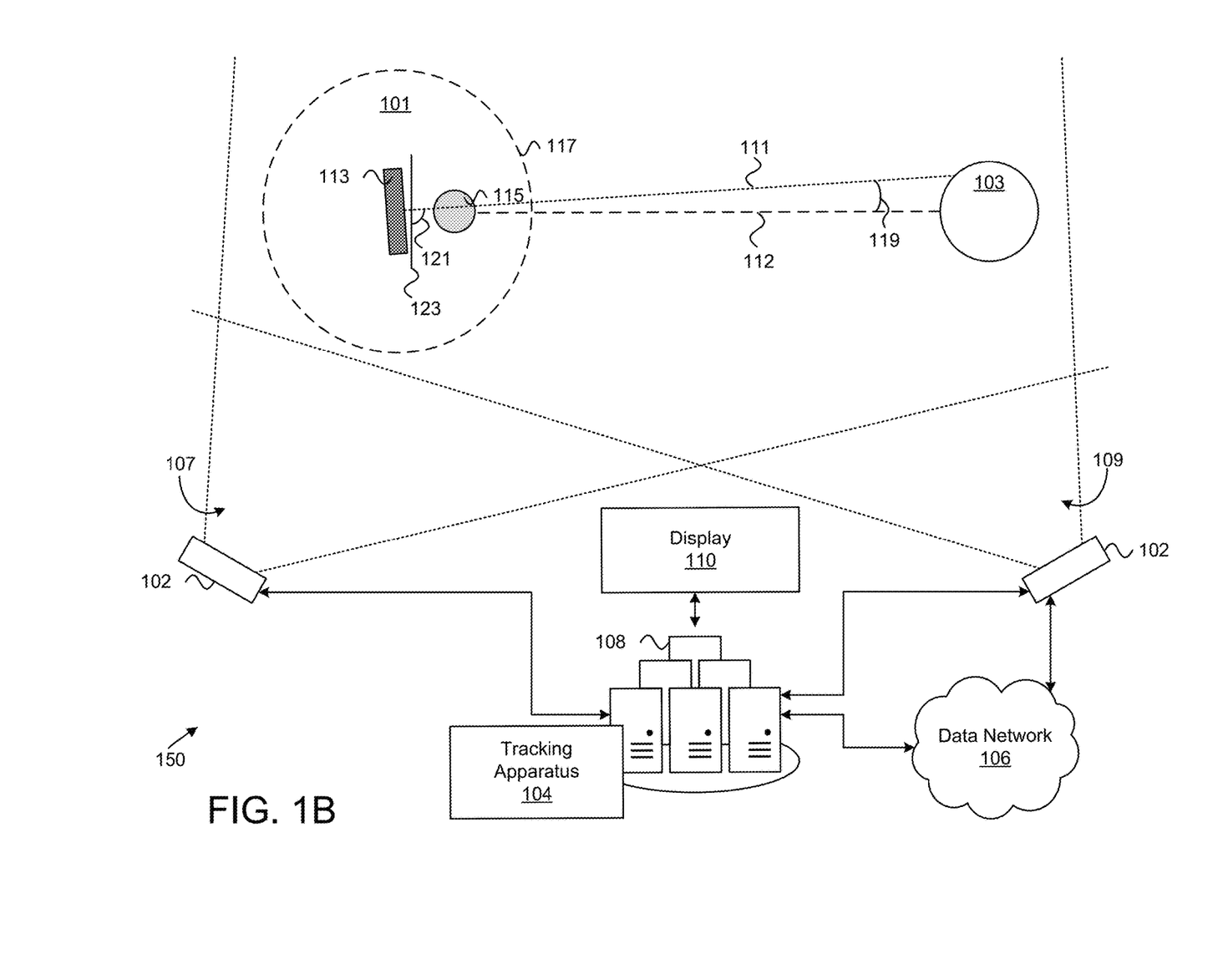
FIG. 1B is a top view of one embodiment of another system for estimating a trajectory path of an object.

FIG. 1B is a top view of one embodiment of another system 150 for estimating a trajectory path of an object. In one embodiment, the system 150 depicted in FIG. 1B may be substantially similar to the system 100 described above with reference to FIG. 1A.

In one embodiment, the initial, starting, placement area 101 is determined according to the positions and configurations of the sensors 102 and the field of views 107, 109 of the sensors 102. In certain embodiments, e.g., if the sensors 102 are placed in static locations, the boundary 117 of the initial area 101 may be drawn, outlined, painted, or otherwise visually marked on the ground. In more dynamic environments, e.g., where the sensors 102 may be moved around or otherwise not statically located, the boundary 117 may be visually marked using lights, e.g., lasers from above or lights from underneath, audible commands, and/or other visual or auditory cues.

In one embodiment, described in more detail below, a target object 115, e.g., a golf ball, may be placed within the boundary 117 of the initial area 101. In certain embodiments, a user can place the target object 115 anywhere within the initial area 101 without requiring a calibration or configuration of the sensors 102. For example, a user can take multiple turns hitting a golf ball with a putter without recalibrating or reconfiguring the sensors 102 between hits. In other words, the proposed solution can dynamically calculate the objective and estimated trajectory paths of the target object 115 without adjusting or configuring the sensors 102 between each hit.

In response to the object being detected in the initial area 101, the sensors 102 may capture data associated with the target object 115. For example, if the sensors 102 are LIDAR sensors 102, the sensor data may include LIDAR data that can be used to generate a digital representation of the target object 115. Further, the sensors 102 may detect a striking object 113, e.g., a putter, placed within the initial area 101.

The sensor data may be used to determine an angle 121 of the face or surface of the striking object 113, relative to a perpendicular plane 123, throughout the motion or swing of the striking object 113 prior to, during, and/or after striking the target object 115. Based on the sensor data, the tracking apparatus 104 can determine an objective path 112 of the target object 115 and an orientation, angle, speed, and/or the like of the face of the striking object 113 prior to, during, and/or after striking the target object 115 and estimate, in real-time, a trajectory path 111 of the target object 115 relative to the objective path 112.

Based on the comparison of the estimated trajectory path 111 with the objective path 112, the tracking apparatus 104 may provide feedback, such as recommendations or suggestions, for increasing the accuracy of the trajectory path 111 relative to the objective path 112, such as instructing the user to change a hand position on the striking object 113, to change an orientation of the striking object 113, to change a speed of the user's swing of the striking object 113, and/or the like, as explained in more detail below.

Figure 2:
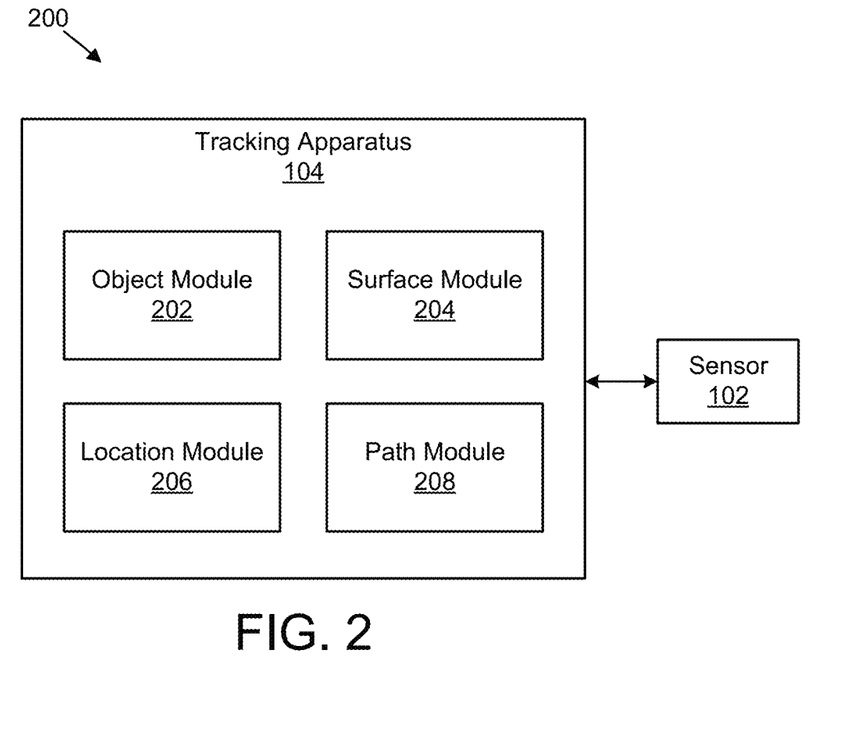
FIG. 2 depicts one embodiment of an apparatus for estimating a trajectory path of an object.

FIG. 2 depicts one embodiment of an apparatus 200 for estimating a trajectory path of an object. In one embodiment, the apparatus 200 includes an embodiment of a tracking apparatus 104. The tracking apparatus 104, in one embodiment, includes one or more of an object module 202, a surface module 204, a location module 206, and a path module 208, which are described in more detail below.

In one embodiment, the object module 202 is configured to identify a target object 115 based on data captured from a first sensor 102. As discussed above, the object module 202 may use sensor data captured by one or more sensors 102 to detect a target object 115 that is within the field of view of the sensors 102 and identify the target object, e.g., a shape of the target object 115, characteristics of the target object 115 (e.g., dimples, seams, laces, grooves, chips, holes, scratches, and/or the like on the surface of the target object 115), and/or the like. The object module 202 may use image processing algorithms such as object detection, edge detection, and/or the like to detect and identify the target object 115.

For example, the sensors 102 may include LIDAR sensors and the object module 202 may use data captured by the LIDAR sensors to determine a distance to the target object 115, in addition to the various characteristics of the target object 115, described above. Other sensors may be envisioned including digital cameras, motion sensors, proximity sensors, sonar sensors, light sensors, and/or the like, and the data from the various sensors, individually or in combination, may be used to detect and identify a target object 115 placed within the initial area 101.

In one embodiment, the object module 202 further determines and tracks at least one of a spin, a roll, and a skid of the target object 115 in response to impact from the striking object 113 based on the data that the sensors 102 capture. The determined or estimated spin, roll, and skid of the target object 115 may be used to further estimate the trajectory path 111 of the target object 115 after the striking object 113 impacts or contacts the target object 115.

In one embodiment, the surface module 204 is configured to identify, using data captured from the first sensor 102, a surface of a striking object 113 that is configured to contact the target object 115 and cause the target object 115 to move along a trajectory path 111 towards a target location 103. The surface module 204, for example, may identify, recognize, or otherwise determine a face of a golf club, e.g., a putter, an iron, a driver, or the like; a surface of a baseball or softball bat; a surface of a hockey stick; and/or the like.

The surface module 204 may use data that the sensor 102 captures to identify the surface of the striking object 113. For instance, the surface module 204 may use LIDAR data to generate a digital representation of the surface of the striking object 113 and may cross reference the digital representation with a database, e.g., an image database, of various striking objects 204 to determine the type of striking object 113 that is being used. In some embodiments, the surface module 204 may also identify characteristics of the surface of the striking object 113 such as the shape of the striking object 113; grooves, lettering, scratches, or the like on the surface of the striking object 113; and/or the like.

In one embodiment, the surface module 204 determines an orientation of the surface of the striking object 113 relative to the target object 115, relative to the target location 103, relative to the sensors 102, relative to a perpendicular plane 123, and/or the like, based on the sensor data that the sensors 102 capture. The orientation, as used herein, may include an angle 121, pitch, yaw, or the like of the striking object 113. The orientation may be used to determine the estimated trajectory path 111 of the target object 115 prior to, e.g., at address of the target object 115, during impact with the target object 115, and/or through the movement of the striking object 113. For example, the surface module 204 may detect that a putter face is not directly perpendicular to the surface of a golf ball but is instead angled 5° away from the golf ball during the approach and/or while making impact with the golf ball. The path module 208, described below, may use the determined orientation as part of the calculation to determine the estimated trajectory path 111 of the target object 115.

In one embodiment, the surface module 204 uses the detection, identification, and/or the like of the target object 115 as a key, symbol, marker, flag, or the like for identifying the striking object 113, and in particular, the surface of the striking object 113 that contacts the target object 115. For example, the surface module 204 may use the detection and location of a golf ball within the initial area 101 as a key for identifying a putter, an iron, a driver, and/or other golf club placed behind, proximate to, adjacent to, or the like the golf ball. The surface module 204 may use image processing algorithms such as object detection, edge detection, and/or the like to detect and identify the surface of striking object 113.

In one embodiment, the location module 206 is configured to identify the target location 103 for the target object 115 based on data captured from a second sensor 102. The target location 103, in one embodiment, may be a goal location that is designated as an ending point for the target object 115 after it is hit with the striking object 113. Examples of target locations 103 may include a golf cup, a net, a target, a bounded area on the ground (e.g., a circle or multiple circles), and/or the like. The location module 206 may identify markers, lines, symbols, and/or the like that mark the target location 103 within the captured sensor data. Based on the captured sensor data, the location module 206 may generate a digital representation of the target location 103 relative to the sensor(s) 102 that are used to identify the target location 103.

In one embodiment, the path module 208 is configured to estimate, calculate, determine, or the like an objective path 112 of the target object 115 relative to the target location 103 prior to the striking object 113 contacting the target object based on the data captured from at least one of the first and second sensors 102. The path module 208, for instance, may estimate a distance between the target object 115 and the target location 103 based on the positions, angles, configurations, distances, and/or the like of the sensors 102 relative to the target object 115 and the target location 103. Based on the location of the target object 115 and the target location 103, the path module 208 may identify, calculate, determine, and/or the like a goal, target, or objective trajectory, path 112, or the like. In a putting example, the objective path 112 for a golf ball may be a straight line between the golf ball, e.g., the target object 115, and the cup or hole, e.g., the target location 103.

As explained in more detail below, the path module 208 may estimate a trajectory path 111 of the target object 115 relative to the target location 103 based on an angle 121, orientation, position, or the like of the surface of the striking object 113 before, during, and/or after the striking object 113 contacts the target object 115. In such an embodiment, the path module 208 may identify, calculate, determine, and/or the like the estimated trajectory path 111 of the target object 115 based on various variables, factors, parameters, or the like such as an orientation or angle 121 of the surface of the striking object 113 relative to the target object 115, a speed of the motion of the striking object 113, how the striking object 113 contacts the target object 115, and/or the like. Such calculations may be determined based on the locations, orientations, positions, angles, or the like of the sensors 102 relative to the striking object 113.

The path module 208 may compare the estimated trajectory path 111 to the goal or objective trajectory path 112 to determine a variance, error, deviation, angle 119, and/or the like of the estimated trajectory path 111 relative to the objective trajectory path 112. In this manner, suggestions, tips, advice, recommendations, and/or the like may be determined and presented to the user in real-time to correct one or more factors, e.g., swing, stance, grip, speed, and/or the like, or provide options for different striking objects 113 and/or target objects 115 for increasing the accuracy of the estimated trajectory path 111 relative to the objective trajectory path 112.

In one embodiment, the path module 208 continuously estimates, in real-time, the trajectory path 111 of the target object 115 relative to the target location 103 in response to detecting movement of the striking object 113. As explained above, the path module 208 can estimate the trajectory path 111 of the target object 115 even before the striking object 113 contacts the target object 115. Accordingly, the path module 208 may continuously receive information from the surface module 204, in response to detecting that the striking object 113 is moving, regarding the angle 121 of the face or surface of the striking object 113 relative to the target object 115 and/or the target location 103 and, in real-time, estimate the trajectory path 111 of the target object 115 relative to the striking object 113 and the target location 103. Accordingly, as described in more detail below, real-time suggestions, advice, tips, and/or other feedback may be provided based on a comparison of the estimated trajectory path 111 with the objective trajectory path 112 even as the estimated trajectory path 111 is updated, adjusted, calculated, or otherwise modified.

Figure 3:
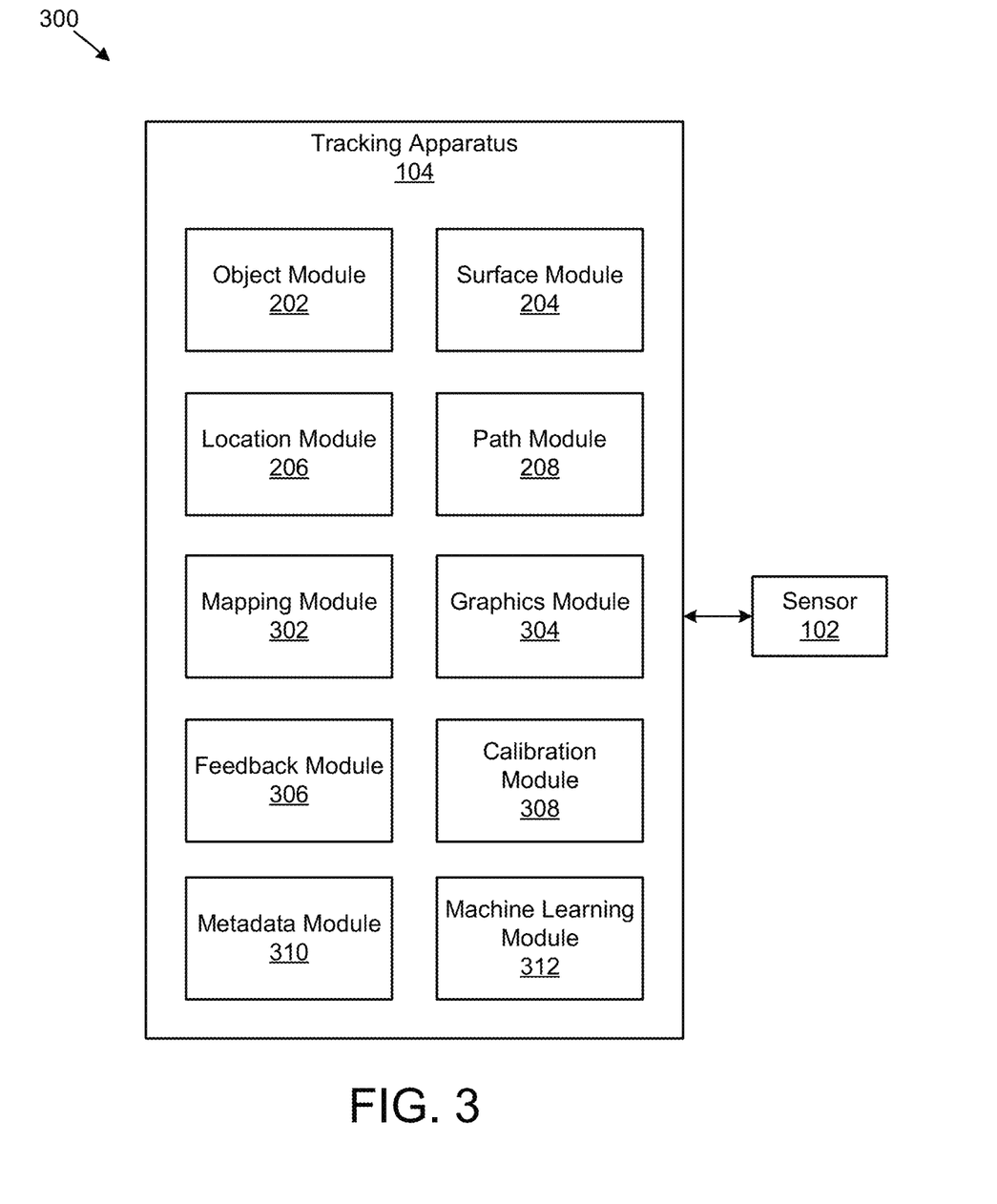
FIG. 3 depicts one embodiment of another apparatus for estimating a trajectory path of an object.

FIG. 3 depicts one embodiment of an apparatus 300 for estimating a trajectory path of an object. In one embodiment, the apparatus 300 includes an embodiment of a tracking apparatus 104. The tracking apparatus 104, in one embodiment, includes one or more of an object module 202, a surface module 204, a location module 206, and a path module 208, which may be substantially similar to the object module 202, the surface module 204, the location module 206, and the path module 208 described above with reference to FIG. 2. In one embodiment, the tracking apparatus 104 depicted in FIG. 3 includes one or more of a mapping module 302, a graphics module 304, a feedback module 306, a calibration module 308, a metadata module 310, and a machine learning module 312, which are described in more detail below.

In one embodiment, the mapping module 302 is configured to map the data captured from the first and second sensors 102 into world coordinates using homography to generate a three-dimensional representation of the target object, striking object, and/or the target location relative to one another. As used herein, homography may refer to an isomorphism of projective spaces, induced by an isomorphism of the vector spaces from which the projective spaces derive. It is a bijection that maps lines to lines, and thus a collineation. In the field of computer vision, any two images of the same planar surface in space may be related by a homography, which has many practical applications, such as image rectification, image registration, or computation of camera motion—rotation and translation—between two images.

Thus, the mapping module 302 may use the sensor data that the sensors 102 capture to generate real-world representations of the various elements of the system 100, 150 such as the initial area 101, the striking object 113, the target object 115, the target area 103, and/or the like so that it appears as a single graphical representation of the environment (e.g., by stitching together images that the sensors 102 capture). The path module 208 may use this real-world representation/coordinate system to estimate the objective path 112 and/or the trajectory path 111 of the target object 115 in real-world coordinates, which may be graphically represented and/or displayed as explained below.

In one embodiment, the graphics module 304 is configured to generate a graphical representation of the estimated objective path 112 and/or the estimated trajectory path 111 of the target object 115 relative to the target location 103 and present the graphical representation on a graphical display 110. The graphics module 304, for instance, may generate a 3D graphical representation of the system 100, 150, including the initial area 101, the target area 103, the striking object 113, and the target object 115, and graphically depict the objective path 112 and the estimated trajectory path 111 of the target object 115 before the striking object 113 contacts the target object 115 and/or during impact of the target object 115.

The graphical representation may include an animation of the target object 115 moving along the estimated trajectory path 111 prior to and/or after it is contacted with the striking object 113. In certain embodiments, the graphics module 304 updates, in real-time, the graphical representation that is presented on the graphical display 110 in response to the estimated trajectory path 111 of the target object 115 relative to the target location 103 being updated. For instance, the graphics module 304 may generate a new graphical representation of the estimated trajectory path 111 as the user moves the striking object 113 around, which causes the path module 208 to update the estimated trajectory path 111 of the target object 115. In this manner, the user can visually see the estimated trajectory path of the target object 115, e.g., golf ball, relative to the objective path 112 as the user sets up for their approach with the striking object, e.g., golf putter, and/or as the user swings and hits the target object 115.

In one embodiment, the feedback module 306 is configured to provide one of audio and graphical feedback, in real time, based on an accuracy of the estimated trajectory path 111 of the target object 115 relative to the objective path 112. As explained above, the accuracy of the estimated trajectory path 111 may be determined relative to the objective or goal trajectory path 112 for the target object 115 (e.g., a straight line from the target object 115 to the target location 103).

The feedback module 306, for instance, may provide recommendations, suggestions, advice, tips, and/or the like for correcting a swing, for adjusting the user's stance, for modifying how the user holds the striking object 113, for changing an orientation of the surface or face of the striking object 113, and/or the like. The path module 208 may estimate different trajectory paths 111 of the target object 115 based on the provided feedback and the graphics module 304 may graphically present each of the estimated trajectory paths 111 on the display 110 so that the user can see how the trajectory path of the target object 115 changes by applying the different feedback elements, relative to the objective path 112.

In one embodiment, the feedback module 306 may generate one or more reports for the user that describes the user's swing and what the user can adjust, modify, or change to have a more accurate swing, relative to the objective path 112. The report may include images, graphics, or the like from the graphics module 304, images generated based on the sensor data, and/or other digital photographs that visually illustrate the user's swing and the estimated trajectory path 111 of the target object 113. The report may further include information about the type of striking object 113 that is used and/or the type of target object 115 that is used and suggestions or recommendations for selecting a striking object 113 and/or target object 115. The report may also include information regarding the system 100, 150 including the distance between the target object 115 and the target location 103, the types of sensors used to analyze the user's swing, and/or the like.

In one embodiment, the calibration module 308 is configured to initially calibrate the first and second sensors 102 for an area comprising the target location 103 using one or more tracking fiducials 105 for each of the first and second sensors 102. The initial calibration may be used to configure, focus, initialize, and/or the like the sensors 102 relative to the initial area 101 and the target location 103, e.g., to establish the locations of the initial area 101 and the target location 103 in world coordinates.

In one embodiment, after the initial calibration, additional calibration, or recalibration is not necessary (unless, e.g., the sensors 102 are moved, removed, or added; the initial area 101 and/or the target location 103 is moved; and/or the like). In other words, the system 100, 150 is automatically calibrated for every placement of a target object 115 within the initial area 101 and does not require additional calibration or configuration of the system components, e.g., the sensors 102, which saves time and frustration as compared with conventional systems.

In such an embodiment, the calibration module 308 may use the tracking fiducials 105 to automatically calibrate, adjust, attune, standardize, normalize, and/or the like for each new event, e.g., putting stroke. In other words, the system 100, 150 may automatically calibrate based on where the target object 115 is located within the initial area 101 between each event, without going through the full initial calibration process to calibrate the system 100, 150, e.g., to configure the sensors 102, to establish the locations of the initial area 101 and/or the target location 103, and/or the like.

In this manner, the user can continue to use the system 100, 150 by placing the target object 115 anywhere in the initial area 101, and the tracking apparatus 104 will dynamically calculate or determine the objective trajectory path 112 of the target object 115 relative to the target location 103 and dynamically calculate the estimated trajectory path 111 of the target object 115 towards the target location 103, compare the estimated 111 and objective 112 trajectory paths, and provide feedback to assist the user with adjusting the estimated trajectory path 111 so that it is in line with the objected trajectory path 112 without requiring a full, initial calibration, or re-calibration, of the sensors 102 or other components of the system 100, 150 between hits, swings, and/or the like.

The system 100, 150, in further embodiments, automatically calibrates itself between each event, e.g., putting stroke or hit, in a manner that is seamless and transparent to the user, using data captured from the sensors 102 and based on the location of the target object 115 and the target location 103 in order to accurately calculate the objective 112 and estimated 111 trajectories of the target object 115 between each hit. Auto-calibration may refer to identifying the target object 115 and the target location 103, dynamically adjusting sensor settings such as the focus, frame rate, sensitivity, and/or the like, based on the location or position of the target object 115, and/or the like, without requiring a full initial or manual calibration of the system 100, 150.

In one embodiment, the metadata module 310 is configured to provide additional information to the user based on the type of striking object 113 that is being used, based on the type of target object 115 that is being used, and/or the like. In one embodiment, the metadata module 310 is configured to receive information for identifying a type of the striking object 113. The information may include a bar code or other code associated with the striking object 113 that provides a type, brand, model, serial number, model number, and/or the like; identifying information captured using the sensors 102 (e.g., a brand, model, or other identifying characteristics of the striking object 113); and/or the like.

The metadata module 310 is further configured to determine specification information for the identified type of the striking object 113. The specification information may include information describing characteristics of the striking object 113 such as an angle of the surface/face of the striking object 113, a weight of the striking object 113, characteristics of the surface/face of the striking object (e.g., grooves, bumps, dimples, and/or the like), a material that the striking object 113 is made of, and/or the like, which may be queried from a database, a website, a user manual, and/or the like.

In one embodiment, the path module 208 may use the specification information to further estimate trajectory paths 111 of the target object 115 relative to the striking object 113, and the graphics module 304 may graphical depict different estimated trajectory paths 111 based on the different types of striking objects that are used.

For example, a user may enter a kiosk that includes the system 100, 150 and take three different golf putters into the kiosk. Upon entry, the user may scan a barcode for each of the putters so that specification information for each of the putters can be retrieved/queried. The specification information can then be used to further estimate a trajectory path 111 of a golf ball upon approach and/or through contact between each of the putters and the golf ball. In this manner, the user can get real-time, accurate information and feedback for each of the putters to determine which of the putters is best suited for the user (e.g., which putter is more accurate given the user's tendencies such as grip, swing motion, stance, eye alignment, and/or the like). The user can determine this information in a relatively short time period because it is not required to manually recalibrate the system 100, 150 between each swing.

In one embodiment, the machine learning module 312 is configured to use machine learning algorithms for identifying at least one of the target object 115, the surface of the striking object 113, and/or the target location 103 based on the data captured from the first and second sensors 102. As used herein, machine learning may refer to computer algorithms that can improve automatically through experience and by the use of data. Machine learning algorithms build a model based on sample data, known as "training data," in order to make predictions or decisions without being explicitly programmed to do so.

Thus, as used herein, the machine learning module 312 may generate a machine learning model that is trained on sensor data, e.g., LIDAR data, for recognizing or identifying objects from the sensor data such as target objects 115, e.g., balls, and/or striking objects 113, e.g., clubs. The object module 202 and/or the surface module 204 may use the machine learning module 312 to identify striking objects 113, target objects 115, and/or the like by feeding the machine learning module 312 sensor data captured from within the initial area 101, which in turn is input into the machine learning model to identify objects within the initial area 101. The machine learning module 312 may be used to identify other features of the system 100, 150 such as the fiducials, to generate homography between sensor views, to account for inconsistencies on the ground along the estimated trajectory path, and/or the like.

Figure 4:
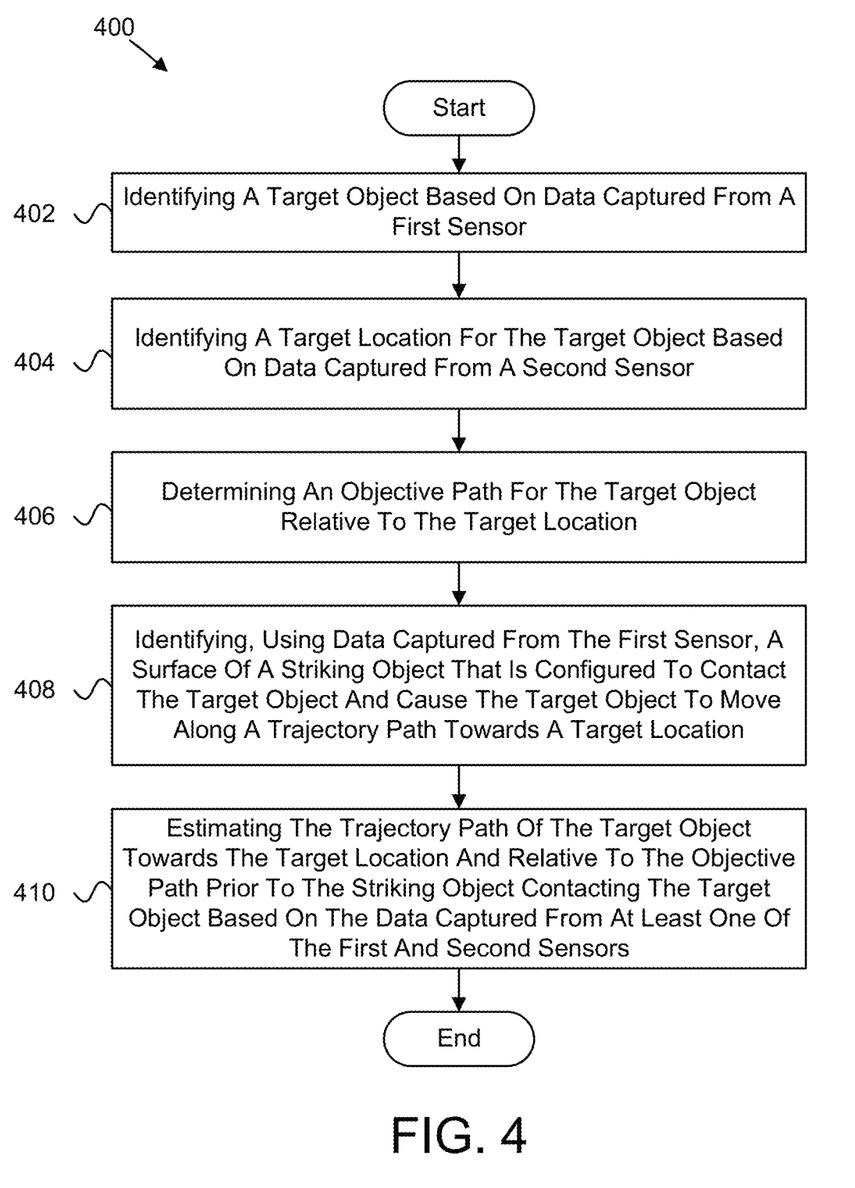
FIG. 4 is a schematic block diagram illustrating one embodiment of a method for estimating a trajectory path of an object.

FIG. 4 depicts a schematic flow chart diagram illustrating one embodiment of a method 400 for estimating a trajectory path of an object. In one embodiment, the method 400 begins and identifies 402 a target object 115 based on data captured from a first sensor 102. In further embodiments, the method 400 identifies 404 the target location 103 for the target object 115 based on data captured from a second sensor 102.

In one embodiment, the method 400 determines 406 an objective path 112 for the target object 115 relative to the target location 103. In further embodiments, the method 400 identifies 408, using data captured from the first sensor 102, a surface of a striking object 113 that is configured to contact the target object 115 and cause the target object 115 to move along a trajectory path 111 towards a target location 103. In one embodiment, the method 400 estimates 410 the trajectory path 111 of the target object 115 towards the target location 103 and relative to the objective path 112 prior to the striking object 113 contacting the target object 115 based on the data captured from at least one of the first and second sensors 102, and the method 400 ends. In one embodiment, the object module 202, the surface module 204, the location module 206, and the path module 208 perform the various steps of the method 400.

Figure 5:
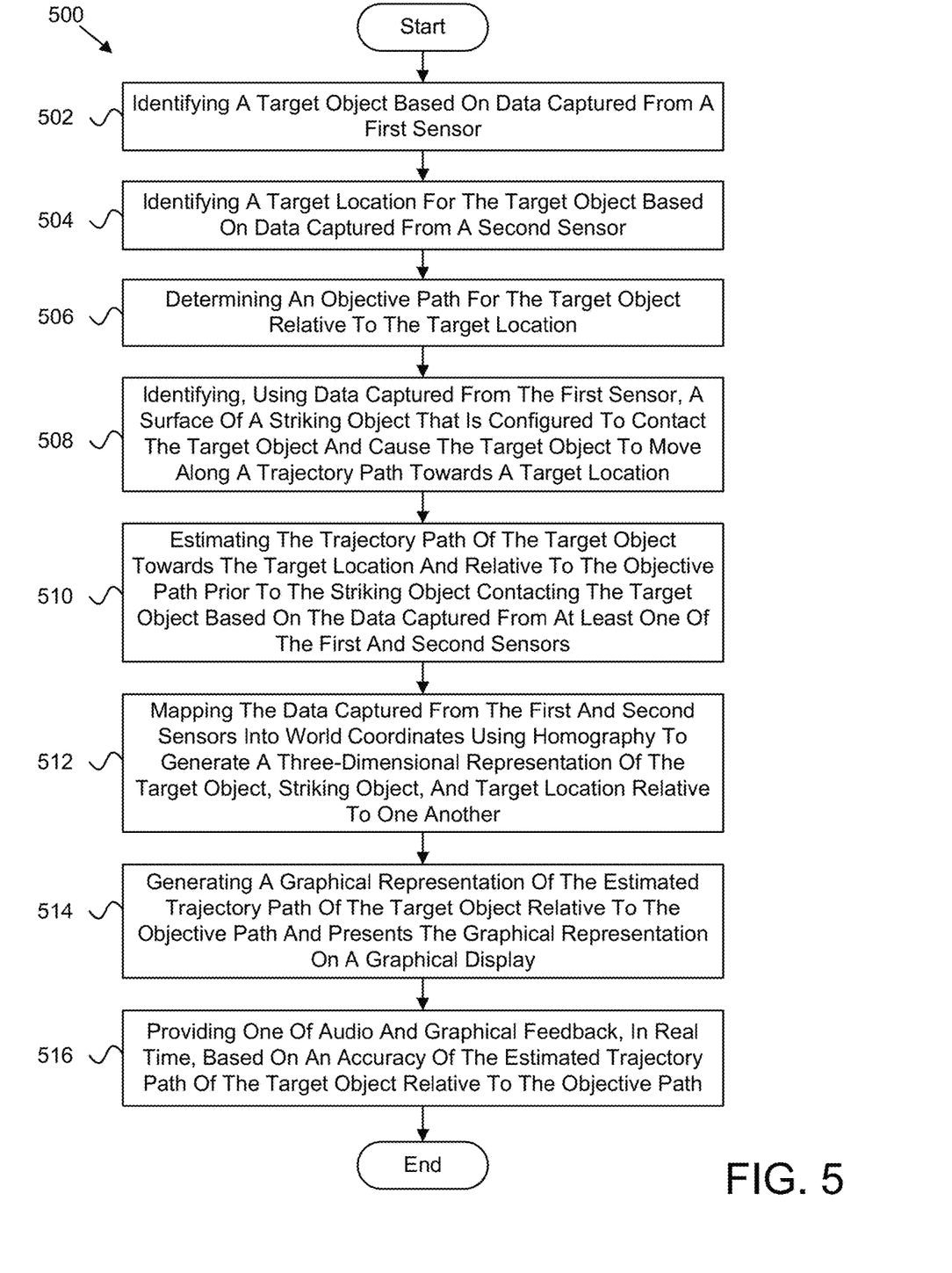
FIG. 5 is a schematic block diagram illustrating one embodiment of another method for estimating a trajectory path of an object.

FIG. 5 depicts a schematic flow chart diagram illustrating another embodiment of a method 500 for estimating a trajectory path of an object. In one embodiment, the method 500 begins and identifies 502 a target object 115 based on data captured from a first sensor 102. In further embodiments, the method 500 identifies 504 the target location 103 for the target object 115 based on data captured from a second sensor 102.

In one embodiment, the method 500 determines 506 an objective path 112 for the target object 115 relative to the target location 103. In one embodiment, the method 500 identifies 508, using data captured from the first sensor 102, a surface of a striking object 113 that is configured to contact the target object 115 and cause the target object 115 to move along a trajectory path 111 towards the target location 103.

In one embodiment, the method 500 estimates 510 the trajectory path 111 of the target object 115 towards the target location 103 and relative to the objective path 112 prior to the striking object 113 contacting the target object 115 based on the data captured from at least one of the first and second sensors 102.

In one embodiment, the method 500 maps 510 the data captured from the first and second sensors 102 into world coordinates using homography to generate a three-dimensional representation of the target object 115, striking object 113, and target location 103 relative to one another. In one embodiment, the method 500 generates 512 a graphical representation of the estimated trajectory path 111 of the target object 115 relative to the objective path 112 and presents the graphical representation on a graphical display 110.

In further embodiments, the method 500 provides 514 one of audio and graphical feedback, in real time, based on an accuracy of the estimated trajectory path 111 of the target object 155 relative to the objective path 112, and the method 500 ends. In one embodiment, the object module 202, the surface module 204, the location module 206, the path module 208, the mapping module 302, the graphics module 304, and the feedback module 306 perform the various steps of the method 500.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   an object module that identifies a target object at rest based on data captured from a first sensor;
   a location module that identifies a predefined target location for the target object based on data captured from a second sensor;
   a path module that determines an objective path for the target object towards the target location, the objective path describing an estimated trajectory of the target object such that the target object arrives at the target location, based on the sensor data captured using the first sensor and the second sensor; and
   a surface module that identifies, using the data captured from the first sensor, a surface of a striking object that is configured to contact the target object and cause the target object to move along a trajectory path towards a target location,
   wherein the path module estimates the trajectory path of the target object towards the target location and relative to the objective path prior to the striking object contacting the target object based on surface data for the surface of the striking object captured from the first sensor and target location data captured from the second sensor, and
   wherein a feedback module provides real-time instructions for adjusting the striking object to increase an accuracy of the trajectory path relative to the objective path prior to the striking object contacting the target object, and
   wherein at least a portion of said modules comprise one or more of hardware circuits, programmable hardware circuits, and executable code, the executable code stored on one or more non-transitory computer readable storage media.

2. The apparatus of claim 1, wherein the surface module further determines an orientation of the surface of the striking object relative to the target object based on the data that is captured from the first sensor, the orientation used to estimate the trajectory path of the target object.

3. The apparatus of claim 2, wherein the surface module further determines the orientation of the surface of the striking object relative to the target object at one or more of address of the target object, impact of the target object, and throughout the movement of the striking object.

4. The apparatus of claim 1, wherein the surface module uses the identification of the target object based on data captured from the first sensor as a key for identifying the surface of the striking object.

5. The apparatus of claim 1, further comprising a mapping module that maps the data captured from the first and second sensors into world coordinates using homography to generate a three-dimensional representation of the target object, striking object, and target location relative to one another.

6. The apparatus of claim 1, wherein the object module further determines and tracks at least one of a spin, roll, and skid of the target object in response to impact from the striking object, which is further used to estimate the trajectory path of the target object.

7. The apparatus of claim 1, wherein the path module continuously estimates, in real-time, the trajectory path of the target object towards the target location and relative to the objective path in response to detecting movement of the striking object.

8. The apparatus of claim 1, further comprising a graphics module that generates a graphical representation of the estimated trajectory path of the target object relative to the objective path and presents the graphical representation on a graphical display.

9. The apparatus of claim 8, wherein the graphical representation that is presented on the graphical display is updated in real-time in response to the estimated trajectory path of the target object being updated.

10. The apparatus of claim 1, further comprising a feedback module that provides one of audio and graphical feedback, in real time, based on an accuracy of the estimated trajectory path of the target object relative to the objective path.

11. The apparatus of claim 1, further comprising a calibration module that initially calibrates the first and second sensors for an area comprising the target location using one or more tracking fiducials for each of the first and second sensors.

12. The apparatus of claim 1, further comprising a metadata module that:
receives information for identifying a type of the striking object; and
determines specification information for the identified type of the striking object,
wherein the estimated trajectory path of the target object is further determined based on the specification information for the striking object.

13. The apparatus of claim 1, further comprising a machine learning module that uses machine learning algorithms for identifying at least one of the target object, the surface of the striking object, and the target location based on the data captured from the first and second sensors.

14. The apparatus of claim 1, wherein at least one of the first and second sensors comprises a light detection and ranging ("LIDAR") sensor.

15. A method, comprising:
identifying a target object at rest based on data captured from a first sensor;
identifying a predefined target location for the target object based on data captured from a second sensor;
determining an objective path for the target object towards the target location, the objective path describing an estimated trajectory of the target object such that the target object arrives at the target location, based on the sensor data captured using the first sensor and the second sensor;
identifying, using the data captured from the first sensor, a surface of a striking object that is configured to contact the target object and cause the target object to move along a trajectory path towards a target location;
estimating the trajectory path of the target object towards the target location and relative to the objective path prior to the striking object contacting the target object based on surface data for the surface of the striking object captured from the first sensor and target location data captured from the second sensor; and
providing real-time instructions for adjusting the striking object to increase an accuracy of the trajectory path relative to the objective path prior to the striking object contacting the target object.

16. The method of claim 15, further comprising determining an orientation of the surface of the striking object relative to the target object based on the data that is captured from the first sensor, the orientation used to estimate the trajectory path of the target object.

17. The method of claim 15, further comprising using the identification of the target object based on data captured from the first sensor as a key for identifying the surface of the striking object.

18. The method of claim 15, further comprising continuously estimating, in real-time, the trajectory path of the target object towards the target location and relative to the objective path in response to detecting movement of the striking object.

19. The method of claim 15, further comprising generating a graphical representation of the estimated trajectory path of the target object relative to the objective path and presenting the graphical representation on a graphical display, the graphical representation updated in real-time in response to the estimated trajectory path of the target object being updated.

20. A system, comprising:
a first sensor;
a second sensor;
a target object;
a striking object;
a target location; and
an apparatus, comprising:
an object module that identifies a target object at rest based on data captured from a first sensor;
a location module that identifies a predefined target location for the target object based on data captured from a second sensor;
a path module that determines an objective path for the target object towards the target location, the objective path describing an estimated trajectory of the target object such that the target object arrives at the target location, based on the sensor data captured using the first sensor and the second sensor; and
a surface module that identifies, using the data captured from the first sensor, a surface of a striking object that is configured to contact the target object and cause the target object to move along a trajectory path towards a target location,
wherein the path module estimates the trajectory path of the target object towards the target location and relative to the objective path prior to the striking object contacting the target object based on surface data for the surface of the striking object captured from the first sensor and target location data captured from the second sensor, and
wherein a feedback module provides real-time instructions for adjusting the striking object to increase an accuracy of the trajectory path relative to the objective path prior to the striking object contacting the target object, and
wherein at least a portion of said modules comprise one or more of hardware circuits, programmable hardware circuits, and executable code, the executable code stored on one or more non-transitory computer readable storage media.

* * * * *